United States Patent [19]

Wood et al.

[11] 4,398,899
[45] Aug. 16, 1983

[54] VARIABLE SPEED PULLEY

[75] Inventors: Thomas D. Wood; Garry K. Reiss, both of Mt. Vernon, Ohio

[73] Assignee: The J. B. Foote Foundry Co., Fredericktown, Ohio

[21] Appl. No.: 314,491

[22] Filed: Oct. 23, 1981

[51] Int. Cl.³ .................................................. F16H 11/04
[52] U.S. Cl. ...................................................... 474/37
[58] Field of Search ........................ 474/32, 33, 34, 37

[56] References Cited

U.S. PATENT DOCUMENTS

| | | | |
|---|---|---|---|
| 2,208,430 | 7/1940 | Ostler | 474/33 |
| 2,253,921 | 8/1941 | Van Sant | 474/33 |
| 2,255,567 | 9/1941 | McElroy | 474/34 |
| 2,546,856 | 3/1951 | Frazier | 474/33 |
| 2,594,663 | 4/1952 | Lindell | 474/33 |
| 2,595,203 | 4/1952 | Reeves | 474/33 |
| 2,741,135 | 4/1956 | Numan | 474/33 |
| 2,769,345 | 11/1956 | Bugenhagen | 474/37 |
| 4,117,652 | 10/1978 | Jones et al. | 74/425 |
| 4,232,569 | 11/1980 | Hauser et al. | 74/701 |

FOREIGN PATENT DOCUMENTS

| | | | |
|---|---|---|---|
| 109993 | 8/1960 | Pakistan | 474/33 |
| 428027 | 5/1935 | United Kingdom | 474/37 |

Primary Examiner—Lawrence J. Staab
Assistant Examiner—Andrew Joseph Rudy
Attorney, Agent, or Firm—Allen D. Gutchess, Jr.

[57] ABSTRACT

A variable speed pulley or sheave with a broad speed range is designed particularly for self-propelled lawn mowers. The variable speed pulley is mounted on a drive shaft of a gear unit in the form of a transaxle or transmission located on the mower and is driven through a belt connected to the drive shaft of the mower engine. The engine drive shaft can also drive a mower blade, thus eliminating any special power take-off shaft otherwise required to propel the mower. The variable speed pulley includes two pulley members or halves which are designed with inter-nesting tines and recessed hubs which enable the pulley halves to nest together more fully and thereby increase the speed range by more widely varying the effective diameter of the pulley.

17 Claims, 5 Drawing Figures

VARIABLE SPEED PULLEY

This invention relates to a variable speed pulley having a wide speed range and particularly to such a pulley employed with a gear unit of a lawnmower.

The variable speed pulley is designed to that it has a greater range of speeds than those heretofore known. The pulley can be selectively controlled by the mower operator to vary the speed of the mower over a greater range with a given gear unit, such as a transmission, or a transmission with fewer gear ratios can be employed, in some instances, to lower the overall cost of the mower. With a self-propelled, walking lawn mower, a drive pulley can be mounted on an engine drive shaft along with the mower blade and connected with a driven pulley on the transmission through a belt, so that no separate take-off shaft is required. For a riding-type mower, separate drive trains are usually provided for the mower blade and for the transmission for propelling the mower.

The new variable speed pulley or sheave has two separate pulley members or halves which are designed to be inter-nesting so that pulley halves can be moved toward and away from one another to a greater extent thereby to vary more widely the effective diameter of the pulley which is engaged by the drive belt, thereby to achieve a greater ratio of maximum to minimum diameters and, consequently, a greater range of speeds. One of the pulley halves is mounted on the input shaft of the gear unit in a fixed, nonrotatable position with respect to the shaft, while the other pulley half is mounted for longitudinal movement along the shaft and, preferably, can rotate relative to the shaft but inter-nest in all positions with the fixed pulley half to rotate therewith. The pulley halves have shallow, truncated conical portions which have tines with slots therebetween, with the tines having generally radially-extending fingers with upright fingers at the inner ends extending away from the opposite pulley half and affixed to a central hub. The upright fingers also form grooves around the associated central hub, which grooves receive portions of the tines of the other pulley half when in fully nesting relationship. With a particular variable speed pulley designed in accordance with the invention, a greater variable speed range has been achieved than heretofore obtainable with known variable speed pulleys.

It is, therefore, a principal object of the invention to provide a variable speed pulley with inter-nesting pulley halves which achieves a greater variable speed range than heretofore possible with known variable speed pulleys.

Another object of the invention is to provide a variable speed pulley having two pulley halves with inter-nesting tines and spaced hubs which enable the pulley halves to inter-nest more fully.

A further object of the invention is to provide a variable speed pulley with a greater speed range for gear units of lawn mowers and the like.

Many other objects and advantages of the invention will be apparent from the following detailed description of a preferred embodiment thereof, reference being made to the accompanying drawings, in which.

Figure 1:
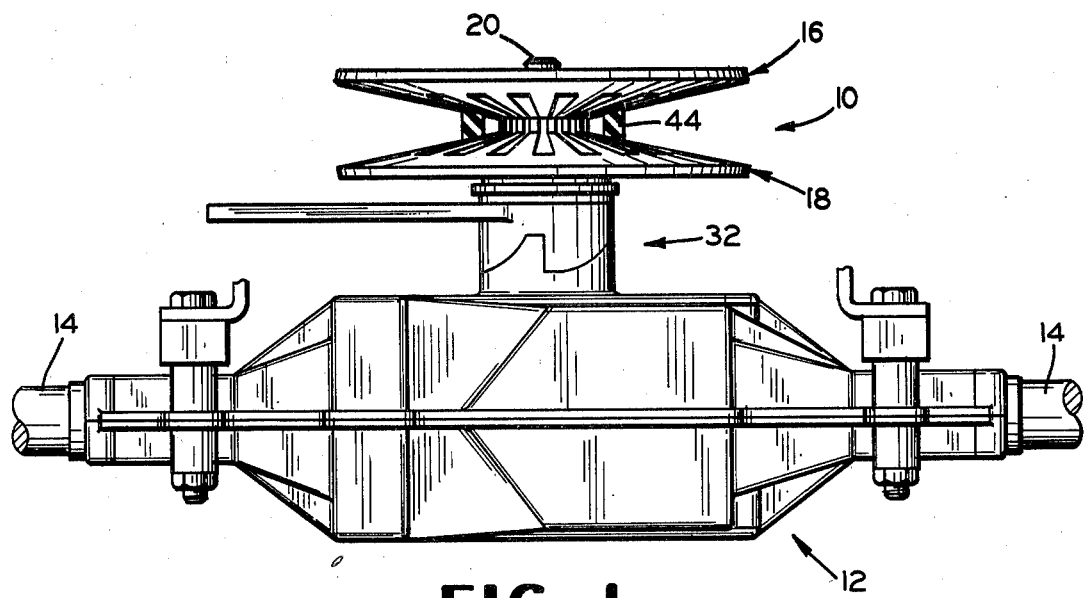
FIG. 1 is a front view in elevation of a transaxle with a variable speed sheave or pulley in accordance with the invention on an input shaft thereof.

Referring to the drawings, and more particularly to FIG. 1, a variable speed pulley or sheave according to the invention is indicated at 10 and is shown in combination with a gear reducing unit 12 in the form of a transaxle, although other gear units such as a transmission, gear reducer, right-angled drive, etc. can be employed. More specifically, the unit 12 is a transaxle of the type shown in U.S. Pat. No. 4,232,569 issued on Nov. 11, 1980, and assigned to The J. B. Foote Foundry Co. The transaxle is suitably mounted on a mower and has output shafts or axles 14 connected to wheels of mowers or other small land vehicles.

The variable speed pulley 10 includes a fixed pulley member or pulley half 16 and a moveable pulley member or pulley half 18 which are located on an input shaft 20 of the transaxle 12. A transverse pin 22 extends through the shaft 20 and cooperates with the pulley half 16 to cause this pulley half and the shaft to rotate together. A second transverse pin 24 is located above the fixed pulley half 16 with a washer 26 therebetween to limit upward longitudinal movement of the pulley half on the shaft. A snap ring 28 is located below the first transverse pin 22 to limit downward longitudinal movement of the fixed pulley half 16 relative to the shaft 20. Of course, other means, such as keys or splines, can be employed to achieve the same purposes.

Figure 2:
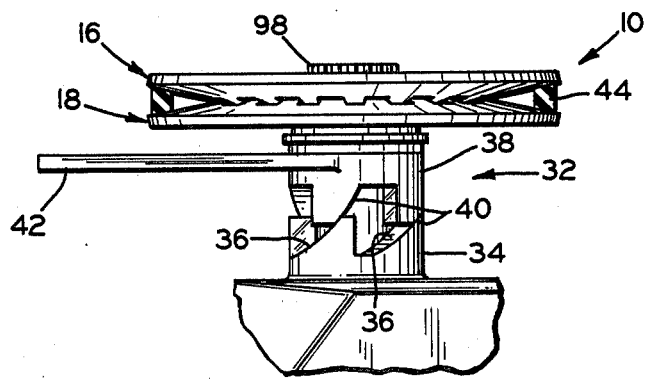
FIG. 2 is a fragmentary view of the transaxle and variable speed pulley of FIG. 1, shown in a different position.
Figure 3:
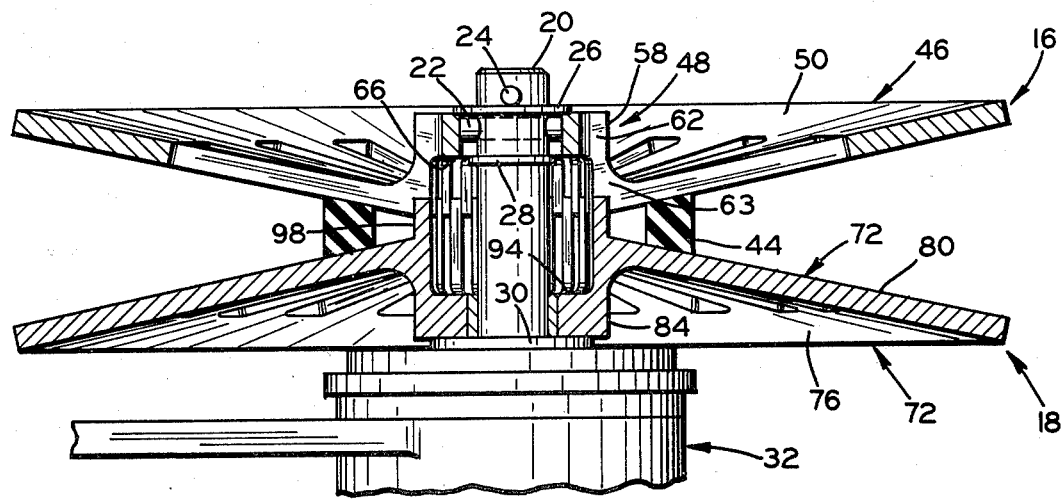
FIG. 3 is a fragmentary view in transverse cross section taken through the variable speed pulley of FIG. 1.

The moveable pulley half 18 can rotate relative to the shaft, although it can be mounted for rotatable movement therewith, as by means of a key and keyway, for example. The moveable pulley half 18 is moveable longitudinally of the shaft 20 and has a roller bearing 30 immediately therebelow. Below the roller bearing 30 is a cam assembly indicated at 32 for moving the moveable half 18 longitudinally. This cam assembly can be similar to that in U.S. Pat. No. 4,117,652, issued on Oct. 3, 1978, and assigned to The J. B. Foote Foundry Co., as specifically disclosed in FIGS. 5 and 7–10 thereof. The cam assembly 32 specifically includes a projection 34 extending upwardly from the transaxle housing and having upwardly-extending cam surfaces 36. A hub member 38 above the projection 34 has lower cam surfaces 40 cooperating with the surfaces 36. When the hub 38 is turned by a lever 42 in a counterclockwise direction, as viewed from above, the hub 38 is raised and, in turn, raises the moveable pulley half 18 from a lowermost position, as shown in FIGS. 1 and 3, toward an uppermost position shown in FIGS. 2 and 4. The lever 42 can be connected with a flexible line or Bowden cable which extends to a speed control assembly (not shown) located near the operator.

Figure 4:
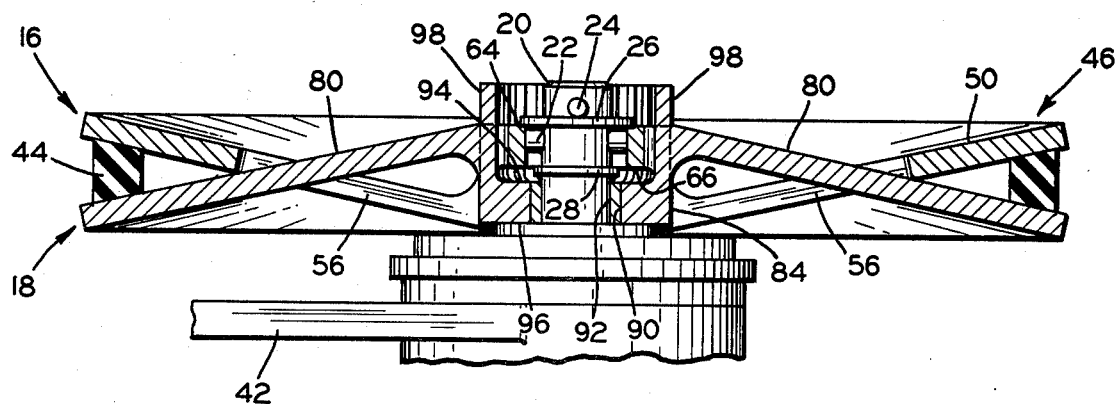
FIG. 4 is a view similar to FIG. 3 but taken through the variable speed pulley in the position of FIG. 2.
Figure 5:
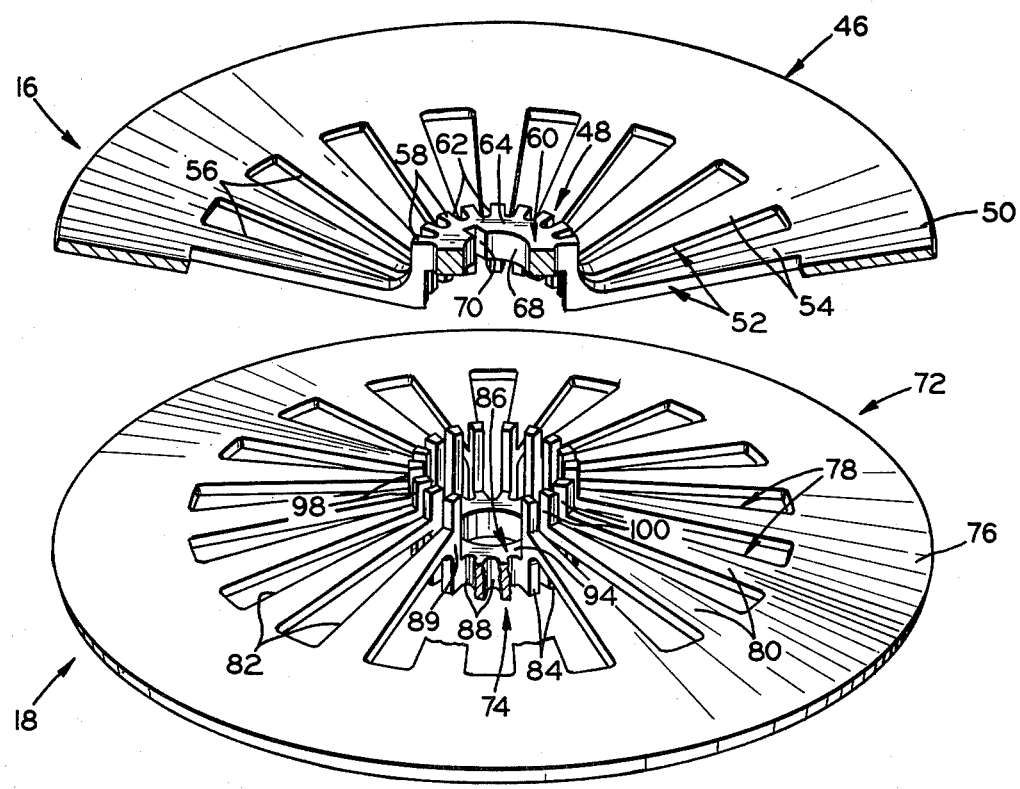
FIG. 5 is a fragmentary, exploded view, with parts broken away and with parts in cross section, of the two pulley halves of the variable speed pulley in accordance with the invention.

When the moveable pulley half 18 is in the lowermost position of FIGS. 1 and 3, a V-belt 44 associated therewith is located in its closest position to the input shaft 20 and rotates the pulley 10 at the fastest speed. Oppositely, when the pulley half 18 is in the uppermost position, as shown in FIGS. 2 and 4, the V-belt 44 is in its farthest position from the shaft 20, causing the shaft to rotate at the slowest speed. This maximum and minimum speed can have a ratio of 2.62 to 1 due to the unique design of the pulley halves 16 and 18, to be discussed subsequently. It is believed that this ratio is the highest attained with variable speed pulleys of this general type.

The pulley member or half 16 of the variable speed pulley 10 basically includes a shallow truncated conical portion 46 and a central hub portion 48 extending away from the conical portion on the concave side. The conical portion 46 has an outer solid rim 50 with a circular periphery. A plurality of tines of generally L-shaped or check-shaped configuration, as viewed in longitudinal cross section, extend from the inner edge of the rim 50 to the hub portion 48. Each of the tines 52 includes a generally radially-extending finger 54 extending inwardly from the rim and narrowing in width in an inward direction. The fingers 54 form generally radially-extending slots 56 therebetween, also narrowing in width in an inward direction. The fingers 54 preferably are equally spaced around the conical portion 46 and are narrower than the slots 56. The tines 52 also include upright fingers 58 extending outwardly on the concave side of the conical portion 46 to an outer edge of a solid hub 60 of the hub portion 48. The upright fingers 58 form grooves 62 therebetween around the hub 60 and slots 63 therebelow which communicate with the inner ends of the slots 56. The upright fingers 58 are preferably equally spaced around the periphery of the hub 60 and are narrower than the grooves 62 and the slots 63. The solid hub 60 has an outer generally planar, annular surface 64 and an inner, generally planar, surface 66 with a central bore or hole 68 through which the shaft 20 extends. The inner surface of the bore 68 also has diametrically opposite notches 70. These receive the transverse pin 22 in the shaft 20 with the washer 26 being adjacent the outer surface 64 and the split ring 28 being adjacent the inner surface 66 when the pulley half 16 and the shaft are in assembled relationship.

In many respects, the pulley member or half 18 is the mirror image of the pulley half 16. The pulley half 18 includes a shallow truncated conical portion 72 and a central hub portion 74 extending away from the conical portion on the concave side. The conical portion 72 includes an outer solid rim 76 with an outer circular edge and with a plurality of tines 78 extending from the inner edge of the rim 76 to the hub portion 74. The tines 78 include generally radially-extending fingers 80 extending inwardly from the rim 76 and narrowing in width in an inward direction. Slots 82 are formed in the conical portion 72 between the fingers 80 and also extend generally radially inwardly and narrow in width in an inward direction. The fingers 80 are preferably equally spaced around the conical portion and are narrower than the slots 82.

Upright fingers 84 extend outwardly from the inner ends of the radially-extending fingers 80 to an outer edge of a solid hub 86 of the hub portion 74. The upright fingers 84 form upright grooves 88 therebetween and upright slots 89 which communicate with the inner ends of the generally radially-extending slots 82. The upright fingers 84 preferably are equally spaced around the periphery of the hub 86 with the upright fingers 84 being narrower than the grooves 88 and the slots 89.

The hub 86 has a bore 90 therethrough with a bushing 92 therein to receive the shaft 20. The hub 86 also has an inner annular, generally planar surface 94 and an outer annular, generally planar surface 96, the latter being adjacent the roller bearing 30.

The pulley half 18 differs from the pulley half 16 in that the former has the bushing 92 and the latter has the notches 70 for the transverse pin. The pulley half 18 also can have additional upright finger extensions 98 which extend inwardly from the inner ends of the generally radially-extending fingers 80. The extensions 98 are in alignment with the upright fingers 84 and form slots 100 therebetween communicating with the inner ends of the slots 82 and the slots 89.

In the operation of the variable speed pulley 10, when the pulley halves 16 and 18 are in their most spaced condition, with the pulley half 18 being in its lowermost position, the finger extensions 98 of the pulley half 18 extend into the inner ends of the slots 82 and the slots 89, as shown in FIG. 3. The extensions 98 thus enable the pulley half 18 to rotate with the pulley half 16 even in their most widely spaced condition. The extensions 98 can be eliminated by connecting the pulley half 18 in a nonrotatable manner on the shaft 20 with the radial fingers of one of the pulley halves aligned with the radial slots of the other, and vice versa. This can be achieved most commonly by the use of a key and a keyway. The finger extensions 98 are preferred, however, because they do not tend to bind and stick the way other nonrotatable connections, such as keys and keyways, are prone to do when the moveable pulley half is moved longitudinally relative to the shaft 20.

When the pulley halves 16 and 18 are moved to their most inter-nesting, closest relationship, as shown in FIG. 4, the generally radially-extending fingers 80 of the pulley half 18 move into and through the generally radially-extending slots 66 of the pulley half 16 with a similar relationship resulting with the fingers 54 of the pulley half 16 and the slots 82 of the pulley half 18. At this time, the upright fingers 98 of the tines 78 move into the grooves 62 of the hub portion 48 and the slots 63 and a similar relationship occurs for the upright fingers 58 of the tines 52 and the groove 88 of the hub portion and the slots 89. At this time, the finger extensions 98 move through and beyond the grooves 62 of the hub portion 48. Thus, the extensions 98 enable the pulley halves 16 and 18 to rotate together in their most spaced condition of FIG. 3 and yet do not interfere with the close, inter-nesting relationship of the pulley halves 16 and 18 in FIG. 4. In this inter-nesting position, the inner annular surface 94 of the hub 86 lies close to the inner annular surface 66 of the hub 60, as shown in FIG. 4.

While the fixed pulley half is shown above the moveable one, of course, these could be reversed. The pulley could also be located below or on one side of the gear unit. Other means can also be used to move the moveable pulley half longitudinally on the shaft.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. A variable speed pulley comprising a first pulley half and a second pulley half, a shaft extending through said pulley halves with said first pulley half being mounted for rotation with said shaft and said second pulley half being slidably mounted on said shaft, said first pulley half having a shallow truncated conical portion and a central hub portion extending outwardly from said conical portion and away from said second pulley half, said shallow conical portion having an outer rim with a circular periphery and a plurality of generally radially-extending fingers extending inwardly from said rim and narrowing in width in an inward direction, said fingers forming generally radially-extending slots therebetween and narrowing in width in an inward direction, said hub portion having a hub with a central hole for receiving said shaft, said hub portion having a plurality of upright fingers extending from inner ends of said radially-extending fingers to an outer surface of said hub, said upright fingers forming grooves therebetween around said hub and upright slots below said hub communicating with inner ends of said generally radially-extending slots; said second pulley half having a shallow truncated conical portion and a central hub portion extending outwardly from said conical portion away from said first pulley half, said shallow conical portion having an outer rim with a circular periphery and a plurality of generally radially-extending fingers extending inwardly therefrom and narrowing in width in an inward direction, said fingers forming generally radially-extending slots therebetween and narrowing in width in an inward direction, said hub portion having a hub with a central hole for receiving said shaft, a plurality of upright fingers extending from inner ends of said generally radially-extending fingers to an outer surface of said hub, said upright fingers forming grooves therebetween around said hub and upright slots below said hub communicating with inner ends of said generally radially-extending slots; said radially-extending fingers of said first conical portion extending into said radially-extending slots of said second conical portion when said pulley halves are moved together and said upright fingers of said second hub portion extending into the grooves of said first hub portion when said pulley halves are moved together.

2. A variable speed pulley according to claim 1 characterized by said hub of said first hub portion having a generally planar annular surface facing toward said second pulley half and said hub portion of said second pulley half having a generally planar annular surface facing toward said first pulley half with said annular surfaces being adjacent one another when said pulley halves are moved to their closest, inter-nesting positions.

3. A variable speed pulley according to claim 1 characterized by one of said pulley halves having extensions on the upright fingers extending toward the other pulley half with said extensions being received in the upright slots of the other pulley half when said pulley halves are in their most spaced position.

4. A variable speed pulley according to claim 3 characterized by said second pulley half also being rotatably mounted on said shaft.

5. A variable speed pulley according to claim 3 characterized by said other pulley half having an outer generally planar, annular surface on the hub with the grooves formed therearound extending completely to said outer annular surface, said extensions being received in said grooves when said pulley halves are in their closest, inter-nesting position.

6. A variable speed pulley according to claim 1 characterized by said shaft on which said pulley halves are mounted being an input shaft of a gear unit, and means mounted on said gear unit for moving said second pulley half longitudinally of said shaft.

7. A variable speed pulley according to claim 6 characterized by said moving means comprising a fixed cam member mounted on said gear unit and a moveable cam member in contact with said fixed cam member and moveable toward and away from said first pulley half when said second cam member is turned relative to said first cam member.

8. A variable speed pulley according to claim 7 characterized by said second cam member having an outwardly-extending lever for being turned by remotely located means.

9. A variable speed pulley to be mounted on a shaft, said pulley comprising a first pulley half and a second pulley half, each of said pulley halves having a shallow truncated conical portion and a central hub portion extending outwardly from the concave side of said conical portion, said conical portion having an outer rim and a plurality of generally radially-extending, generally L-shaped tines extending from said rim to said hub portion, said tines forming generally radially-extending slots therebetween in said conical portion and forming grooves therebetween on said hub portion, said slots and grooves being wider than corresponding portions of said tines, said hub portions having central bores for receiving the shaft and one of said hub portions having means for cooperating with the shaft to cause the corresponding pulley half and shaft to rotate together, the other of said pulley halves being slidable on the shaft.

10. A variable speed pulley according to claim 9 characterized by one of said pulley halves having extensions on the tines extending toward the other pulley half with said extensions being received between the tines of the other pulley half when said pulley halves are in their most spaced condition.

11. A variable speed pulley according to claim 9 characterized by each of said hub portions having hubs with generally planar annular surfaces on opposite sides thereof with facing surfaces being adjacent when said pulley halves are in their closest nesting position.

12. A variable speed pulley according to claim 11 characterized by one of said pulley halves having extensions on said tines extending toward the other pulley half, the grooves on the hub portion of said other pulley half extending between the generally planar annular surfaces on the opposite sides of the hub of said other pulley half, with said extensions received in said grooves of said other pulley half when said pulley halves are in their closest, inter-nesting positions.

13. A variable speed pulley according to claim 9 characterized by said tines also forming upright slots extending between said grooves and said generally radially-extending slots.

14. A variable speed pulley according to claim 13 characterized by one of said pulley halves having extensions on the tines extending toward the other pulley half with said extensions being received in said upright slots of said other pulley half for all positions of said pulley halves 15. A variable speed pulley to be mounted on a shaft, said pulley comprising a first pulley half and a second pulley half, each of said pulley halves having a shallow truncated conical portion and a central hub portion extending outwardly from said conical portion away from the other pulley half, said conical portion having a plurality of generally radially-extending fingers extending outwardly from said hub portion, said fingers forming generally radially-extending slots therebetween in said conical portion, said hub portion having a hub, upright fingers extending outwardly from inner ends of said radially-extending fingers away from the other pulley half, said upright fingers forming grooves therebetween on said hub and forming upright slots between said hub and said radially-extending fingers with said upright slots communicating with said grooves and with said radially-extending slots, said hubs having central bores for receiving the shaft and one of said hubs having means for cooperating with the shaft to cause the corresponding pulley half and the shaft to rotate together; the other of said pulley halves being slidable on the shaft.

16. A variable speed pulley according to claim 15 characterized by each of said conical portions having an outer rim connected with the outer ends of the corresponding generally radially-extending fingers.

17. A variable speed pulley according to claim 15 characterized by one of said pulley halves having extensions on the upright fingers extending toward the other pulley half, with said extensions being received in the upright slots of the other pulley half.

* * * * *